US 6,495,972 B1

(12) United States Patent
Okamoto et al.

(10) Patent No.: US 6,495,972 B1
(45) Date of Patent: Dec. 17, 2002

(54) DIELECTRIC BARRIER DISCHARGE LAMP LIGHT SOURCE

(75) Inventors: Masashi Okamoto, Akashi (JP);
Takashi Asahina, Takasago (JP);
Hiroyuki Kushida, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/720,673

(22) PCT Filed: Apr. 19, 2000

(86) PCT No.: PCT/JP00/02539
§ 371 (c)(1),
(2), (4) Date: Dec. 29, 2000

(87) PCT Pub. No.: WO00/67533
PCT Pub. Date: Nov. 9, 2000

(30) Foreign Application Priority Data

Apr. 30, 1999 (JP) .......................................... 11-124401
Apr. 6, 2000 (JP) ....................................... 2000-105165

(51) Int. Cl.[7] .............................................. H05B 37/02
(52) U.S. Cl. ....................... 315/291; 315/307; 315/246; 363/50
(58) Field of Search ................................. 315/291, 307, 315/308, 225, 224, 219, 246; 363/28, 13, 56.03, 56.05, 56.07, 56.08, 56.1, 56.11, 50

(56) References Cited

U.S. PATENT DOCUMENTS

| | | | | |
|---|---|---|---|---|
| 4,876,689 A | * | 10/1989 | Egawa | 372/29.015 |
| 4,983,881 A | | 1/1991 | Eliasson et al. | 313/607 |
| 5,119,262 A | * | 6/1992 | Ikeuchi | 315/411 |
| 5,886,480 A | * | 3/1999 | Penzenstadler et al. | 315/106 |
| 5,977,722 A | | 11/1999 | Yokokawa et al. | 315/207 |
| 6,087,776 A | * | 7/2000 | Yamashita et al. | 315/225 |
| 6,229,721 B1 | * | 5/2001 | Mano et al. | 363/56.1 |

FOREIGN PATENT DOCUMENTS

| | | |
|---|---|---|
| JP | 08-031585 | 2/1996 |
| JP | 08-203684 | 8/1996 |
| JP | 08-264289 | 10/1996 |

OTHER PUBLICATIONS

Discharge Handbook, Jun. 1989, Revised New Edition Issued by the Institute of Electrical Engineers of Japan, Seventh Printing, pp. 263–271.

* cited by examiner

Primary Examiner—Don Wong
Assistant Examiner—Ephrem Alemu
(74) Attorney, Agent, or Firm—Nixon Peabody LLP; David S. Safran

(57) ABSTRACT

A dielectric barrier discharge lamp light source device having a discharge space filled with a discharge gas that emits light through dielectric barrier discharge. The device is provided with a dielectric barrier discharge lamp having a structure in which dielectrics are interposed between at least one of two electrodes to induce a discharge phenomenon in the discharge gas, and a power supply device for providing alternating current high voltage to the electrodes of the dielectric barrier discharge lamp. The power supply device further includes an abnormal discharge detection circuit for detecting an abnormal discharge occurring within transformers in the power supply device or within a section from the secondary side output terminal of a transformer to the electrodes, the power supply device acting to halt the supply of alternating current high voltage from the power supply device to the dielectric barrier discharge lamp when the abnormal discharge detection circuit detects abnormal discharge. The abnormal discharge detection circuit has the ability to detect only an abnormal discharge arising from electrical behavior of the power supply device without being a detector of special abnormal discharge due to photo, acoustic, thermal or chemical conditions.

11 Claims, 7 Drawing Sheets

DIELECTRIC BARRIER DISCHARGE LAMP LIGHT SOURCE

BACKGROUND OF THE INVENTION

1. Field of the Invention

The present invention pertains generally to a light source device that utilizes the light emission or heat generated in discharge gases through a dielectric barrier discharge in a dielectric barrier discharge lamp light source device such as a dielectric barrier discharge lamp that generates ultraviolet light rays through an excimer light emission or a noble gas lamp that combines a phosphor.

2. Description of Related Art

U.S. Pat. No. 4,983,881 discloses a dielectric barrier discharge, also known as a ozonizer discharge or a silent discharge, which is utilized as an excimer lamp for ozonizers or dielectric barrier discharge lamps, or, as disclosed in U.S. Pat. No. 5,977,722, the dielectric barrier discharge may also utilized as a noble gas light emission lamp.

A conventional dielectric barrier discharge lamp generally includes two dielectrics and at least one dielectric that is present between two electrodes which enclose a discharge space within the dielectric barrier discharge. In such a connection, a sealed unit combines the dielectrics in the dielectric barrier discharge lamp. Current does not directly flow from the electrodes to the discharge space since the dielectrics are interposed between discharge space and the electrodes. Consequently, current flows through dielectrics functioning as capacitors. Equal charges of opposite signs are evoked by dielectric polarization on the side of each electrode on the discharge space side of each dielectric and, are discharged between the opposing dielectrics that hold discharge space between them. For that reason, a high voltage alternating current of approximately 10 kHz–10 MHz and 1 kV–10 kV is applied to both electrodes when lighting the dielectric barrier discharge lamp. The ideal conditions associated with the voltage, frequency, and alternating current voltage waveform would be selected in accordance with the structure of the dielectric barrier discharge lamp 1, the discharge gas constituents, pressure, etc. Of course, the so-called discharge mode termed high frequency discharge or electric field discharge as well as an intermediate form of discharge between these and dielectric barrier discharge are included therein.

As indicated above, dielectric barrier discharge lamps are extremely useful, however, they do present safety problems because of their need for the application of high voltage. For example, if the output terminals of the power supply device have connectors, there is always the possibility of a poor contact developing, but current would naturally still flow due to discharge if the contact were slightly defective and the lamp would light as though it were apparently normal since the output terminals are high-voltage charging units. Consequently, a poor contact would not immediately be apparent. If such events should actually transpire, localized heating due to abnormal discharge at the defective contact or eventual deterioration of peripheral insulation depending on the ruminant could occur, and could subsequently lead to a fire.

As shown in FIG. 9, a second safety hazard could develop as a result of a crack in the electrodes 5, 6, whereby current would flow due to the discharge at the crack site, and theoretically lead to localized heating. Consequently, the electrodes 5, 6 could both theoretically break if cracks should develop in the sealed unit 2. Furthermore, localized heating due to a surface discharge developing in the gap between the electrodes 5, 6 on the surface of lamp sealed unit 2 is also theoretically possible.

Moreover, localized heating due to the development of dielectric barrier discharge at the insulation borders of cables connected to both electrodes 5, 6 is also theoretically possible. Furthermore, there is always the possibility of poor contact or poor conduction brought about by poor conduction attributable to poor contact with connectors, imperfect soldering or breakage of circuit board soldering even within transformers in the power supply device or in the section from the secondary side output terminal of a transformer to output terminals of the power supply device. However, current would naturally still flow due to discharge if the contact or conduction were slightly defective and the lamp would light as though it were apparently normal. Consequently, a poor contact or poor conduction would not immediately be apparent. If such events should actually transpire, localized heating due to abnormal discharge at the site of defective contact or defective conduction, or eventual deterioration of peripheral insulation depending on the luminant could occur, and that could theoretically lead to a fire.

Such abnormal discharge could be detected using a photodetector for the light emission. In addition, such detectors as a thermal detector, acoustic detector or vibration detector could be used as well. The detection of ozone generated by ultraviolet rays from abnormal discharge basically would be possible using an ozone detector. Even if detection were possible using the photo, thermal, acoustic, vibration, or ozone detectors, it would be unreliable since sites where abnormal discharge could occur are continuously distributed over a broad range, as mentioned above. Furthermore, these safety countermeasures have involved reliance on lowering the probability of abnormal discharge from occurring by using structures and materials having high insulation resistance since the said countermeasures would be extremely uneconomical as well as unreliable.

SUMMARY OF THE INVENTION

Accordingly, an object of the invention is to overcome the said difficulties by providing a dielectric barrier discharge lamp light source device capable of safely and economically preventing the hazards of abnormal discharge which could occur within transformers of the power supply device of a dielectric barrier discharge lamp light source device or in the section from the secondary side output terminal of a transformer to the electrodes.

This is achieved by providing a dielectric barrier discharge lamp light source device having a discharge space filled with a discharge gas that emits light through a dielectric barrier discharge. The device is provided with a dielectric barrier discharge lamp having a structure in which dielectrics are interposed between at least one of two electrodes to induce a discharge phenomenon in the discharge gas and a power supply device, and a power supply device having an abnormal discharge detection circuit to detect abnormal discharge occurring within transformers in the power supply device or in the section from the secondary side output terminal of a transformer to the electrodes. The power supply device acts to halt the supply of alternating current high voltage from the power supply device to the dielectric barrier discharge lamp when the abnormal discharge detection circuit detects an abnormal discharge. The abnormal discharge detection circuit has the ability to detect only an abnormal discharge arising from electrical behavior of the power supply device, without detecting a special abnormal discharge due to photo, acoustic, thermal or chemical conditions.

The dielectric barrier discharge lamp light source device includes a power supply device having an output level detection means that detects an output substantially proportional to the voltage provided to the dielectric barrier discharge lamp, a drive circuit that provides high voltage alternating current power to the dielectric barrier discharge lamp, and a capacity control circuit which regulates the capacity of the drive circuit, wherein the drive circuit has the ability to set the power supply capacity through a capacity regulating signal created by the capacity control circuit. The capacity control circuit effects feedback control of the capacity regulating signal so as to minimize the error between the output level detection signal created by the output level detection means and the output level target signal. The abnormal discharge detection circuit can detect at least one of a deviation of the capacity regulating signal from the upper limit of the established capacity, or a deviation of the capacity regulating signal from the lower limit of the established capacity.

Alternatively, the power supply device of the dielectric barrier discharge lamp light source may include an output level detection means which detects an output substantially proportional to the power provided to the dielectric barrier discharge lamp, a drive circuit that provides high voltage alternating current power to the dielectric barrier discharge lamp, and a capacity control circuit that regulates the capacity of the drive circuit, wherein the drive circuit can set the power supply capacity by capacity regulating signal created by the capacity control circuit. The capacity control circuit effects feedback control of the capacity regulating signal so as to minimize the error between output level detection signal created by the output level detection means and output level target signal. The abnormal discharge detection circuit can detect if the frequency range component of a capacity regulating signal having preset fluctuation exceeds a predetermined level.

In another embodiment, the dielectric barrier discharge lamp light source includes a power supply device having a drive circuit that provides high voltage alternating current power to the dielectric barrier discharge lamp, output level detection means which detects the output substantially proportional to the power provided to the dielectric barrier discharge lamp in a stage after the drive circuit. The abnormal discharge detection circuit can detect whether the frequency range component of the output level detection signal created by the output level detection means having preset fluctuation exceeds an predetermined level.

DETAILED DESCRIPTION OF THE INVENTION

Figure 1:
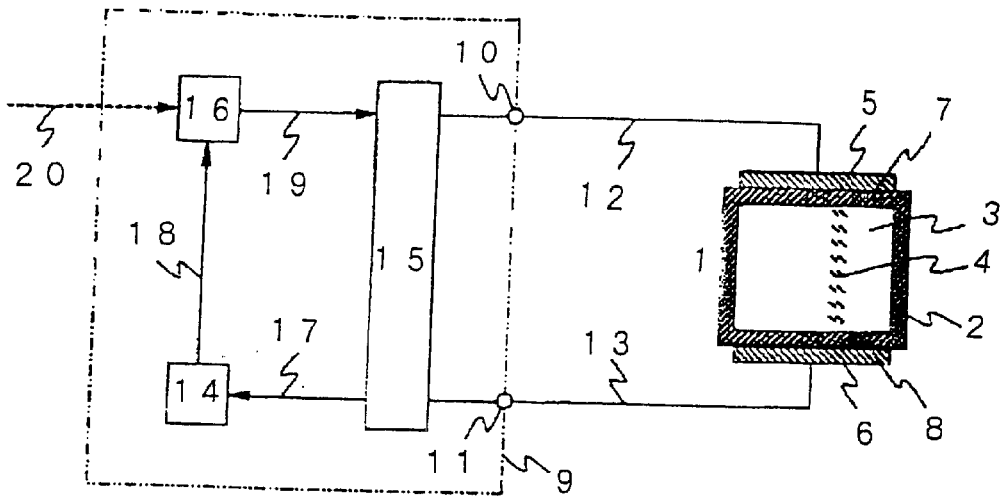
FIG. 1 is a simplified block diagram and a conceptual figure of an embodiment of the invention.

Now referring to the drawings, FIG. 1 shows a simplified diagram including a dielectric barrier discharge lamp 1 having two dielectrics 7, 8 and at least one dielectric that is present between electrodes 5, 6 which enclose a discharge space 3 in the dielectric barrier discharge, a sealed unit 2 which combines the dielectrics 7, 8 in the dielectric barrier discharge lamp 1, and an abnormal discharge detection circuit 14 receiving an input signal 17 from the electrical constituent member inherent to power supply circuit 15 in the power supply device 9. The abnormal discharge detection circuit 14 receives a signal 17 from the electrical circuit element without using a detector of special abnormal discharge due to at least one of photo, acoustic, thermal or chemical conditions.

The function of the abnormal discharge detection circuit 14 is to detect abnormal discharge which arises or has arisen from the behavior or constituents of the signal 17. Upon detecting an abnormal discharge, the abnormal discharge detection circuit 14 subsequently sends a response signal 18 indicating the detection of an abnormality to the circuit unit 16 that allows power supply. Upon receiving the signal 18, the circuit unit 16 would then invalidate the power supply signal 19 to the power supply circuit 15. By adopting such a structure, even if sites where an abnormal discharge occurs are continuously distributed over a broad range, they could be reliably detected by a single abnormal discharge detection circuit 14, and a signal 18 subsequently relayed to the power supply circuit 15 to shut down the power supply, thereby providing a great benefit of enhancing the safety of the dielectric barrier discharge lamp light source device.

A second significant advantage of the invention is that the dielectric barrier discharge lamp light source device is extremely economical since it does not use numerous, expensive special abnormal discharge detectors for photo-, acoustic-, thermal- or chemical matter. A third benefit is that a section of the abnormal discharge detection circuit 14 that detects the abnormal discharge is structured so as to be present only within the power supply device 9, and not at the output terminals 10, 11 of the power supply device 9, at the electrodes 5, 6, at connection means 12, 13 of output terminals 10, 11 of the power supply device 9 and electrodes 5, 6, nor within transformers 81, 114 below or in the vicinity of the course from the secondary side output terminal of the transformer to the output terminals 10, 11. Consequently, spare wiring and connections from power supply device 9 to distant detectors can be omitted, thereby enhancing the reliability of the dielectric barrier discharge lamp light source device.

Once the circuit unit 16 that permits power supply receives a response 18 from the abnormal discharge detection circuit 14 that an abnormality has been detected, operation of a latch circuit would be best so as to maintain the signal 19 of permitted power supply in an invalidated state so long as a reset operation such as cutoff of the power source is not carried out. The circuit unit 16 can receive an external control signal 20 to command dielectric barrier discharge lamp 1 of the dielectric barrier discharge lamp light source device to be turned ON or OFF from outside, and a signal 19 that permits the power supply to power supply circuit 15 may be transmitted only if external control signal 20 has issued an ON command and a response signal 18 that an abnormality has been detected has not been received.

Figure 2:
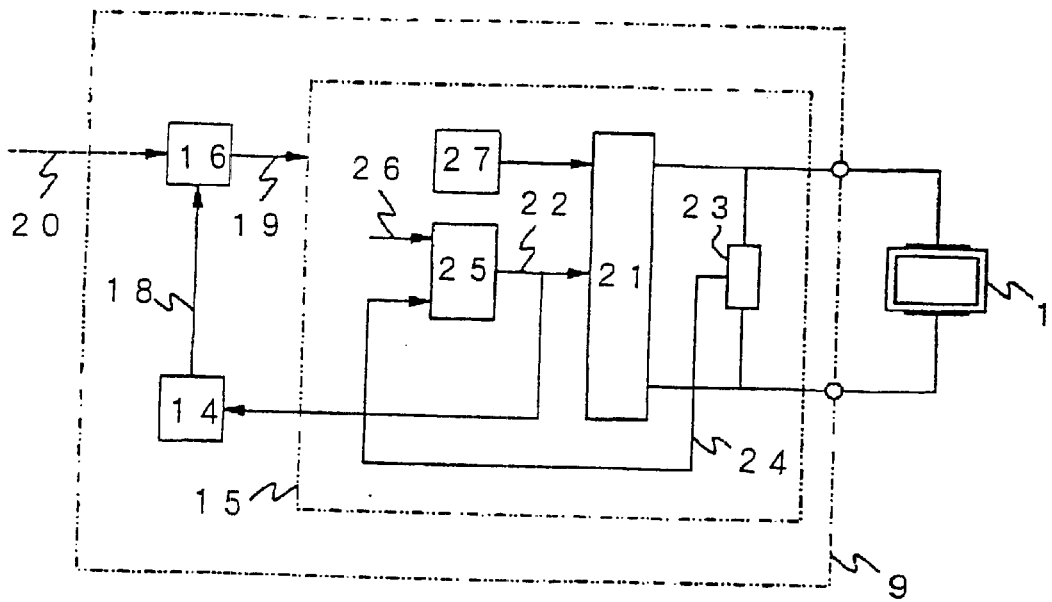
FIG. 2 is a simplified block diagram of a second embodiment of the invention.

FIG. 2 shows a drive circuit 21 that supplies alternating current high-voltage power to the dielectric barrier discharge lamp 1, the drive circuit primarily including a drive DC power source 27, a plurality of inverters including a push-pull inverter, half-bridge inverter, full-bridge inverter, fly-back inverter, and a boosting transformer. This permits the power that is supplied to the lamp 1 to be regulated at least by regulating the voltage of the drive DC power source 27. The power supplied to lamp 1, specifically, the capacity of drive circuit 21, is regulated and set by a capacity regulating signal 22. In addition, an output level detection means 23 is provided for detecting an output substantially proportional to the voltage provided to the dielectric barrier discharge lamp 1. The output that is detected at that time may be the mean of the peak value, RMS value or an absolute value. Also, a mechanism for detecting the voltage of drive DC power source 27 when the drive circuit 21 regulates the power supplied to lamp 1 by regulating the voltage of drive DC power source 27 may be used.

Figure 9:
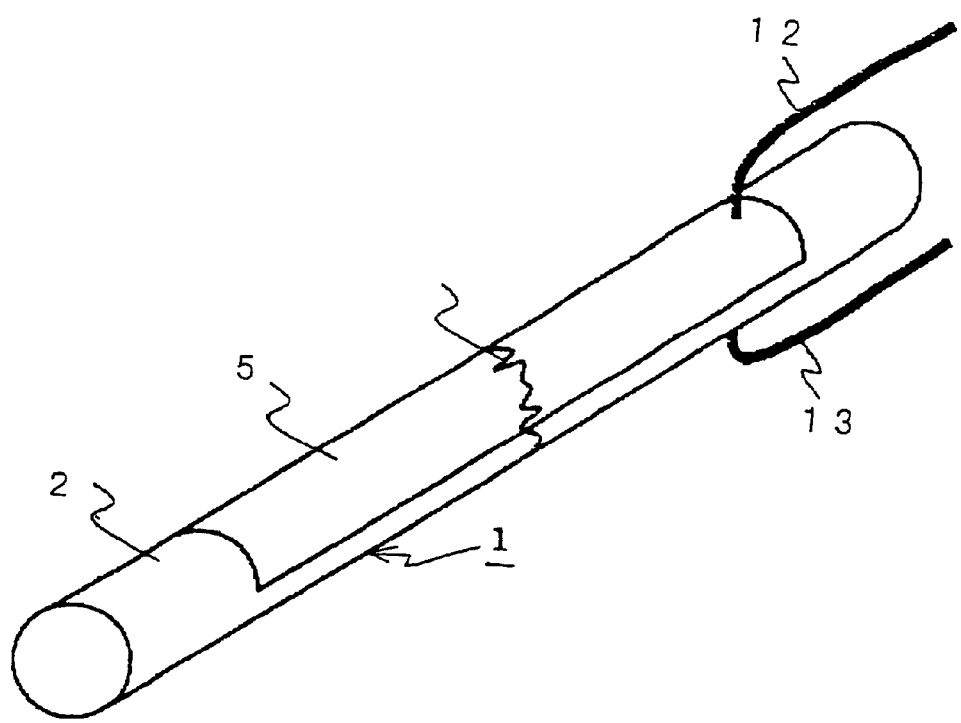
FIG. 9 is a conceptual figure for explaining dielectric barrier discharge lamp breakage and electrode disconnection.

The device further includes a capacity control circuit 25 for regulating the capacity of the drive circuit 21 effecting a feedback control of the capacity regulating signal 22 so that the error between an output level detection signal 24 created by an output level detection means 23 and an output level target signal 26 would be minimized. As a result, the power supplied to lamp 1 is controlled so as to be a substantially constant value that corresponds to the size of output level target signal 26. This may be designed so that the power supplied to lamp 1 increases if the capacity regulating signal 22 and the power supplied to lamp 1 have a positive correlation, that is, as the capacity regulating signal 22 increases. The exhibition by the capacity regulating signal 22 of a value that is significantly smaller than the appropriate value means that the anticipated power would not be consumed. For example, there is a suspicion that discharge would occur at the junction of output terminals 10, 11 of the power supply device 9, that disconnection would take place at electrodes 5, 6, as shown in FIG. 9, or that power could not be effectively applied overall, as mentioned above.

Conversely, the exhibition by the capacity regulating signal 22 of a value that is significantly greater than the appropriate value means that unanticipated power would be consumed. For example, there is a suspicion that surface discharge would occur at the gap of both electrodes 5, 6 on the surface of sealed unit 2 or that heating would take place at the insulation borders of cables connected to both electrodes 5, 6 due to dielectric barrier discharge, as mentioned above. Accordingly, the abnormal discharge detection circuit 14 constantly monitors capacity regulating signal 22 and safely shuts down the power supply device by sending a response signal 18 of abnormality detection to the power supply circuit unit 16, thereby preventing any accident from occurring upon detecting that the capacity regulating signal 22 is significantly smaller than the appropriate value, specifically, that it is smaller than the preset threshold value, or upon detecting that capacity regulating signal 22 is significantly greater than the appropriate value, specifically, that it is greater than the preset threshold value.

The threshold value for the capacity regulating signal 22 must be experimentally determined in combinations of an actual power supply device 9 and the lamp 1. The signal monitored by the abnormal discharge detection circuit 14 may be the signal sent from the capacity regulating signal 22 rather than the capacity regulating signal 22. The function would be identical in that case or if it is another signal having a correlation with the capacity regulating signal 22. The capacity regulating signal 22 would show a value much greater than the appropriate value if a short should develop within transformers 81, 114 of the power supply device 9, or in the route from the secondary side output terminal of a transformer to the electrodes 5, 6 of the lamp 1. Conversely, a no-load open state would develop and the capacity regulating signal 22 would show a value much smaller than the appropriate value if absolutely no power were supplied at all to the lamp 1. At that time, these phenomena can be differentiated from the abnormal discharge by carefully identifying the level of the capacity regulating signal 22. The reason is that the fastest possible shutdown of operation of the power supply device would be advisable for safety, whether the cause is abnormal discharge, shorting, a no-load open state or any other abnormality.

Figure 3:
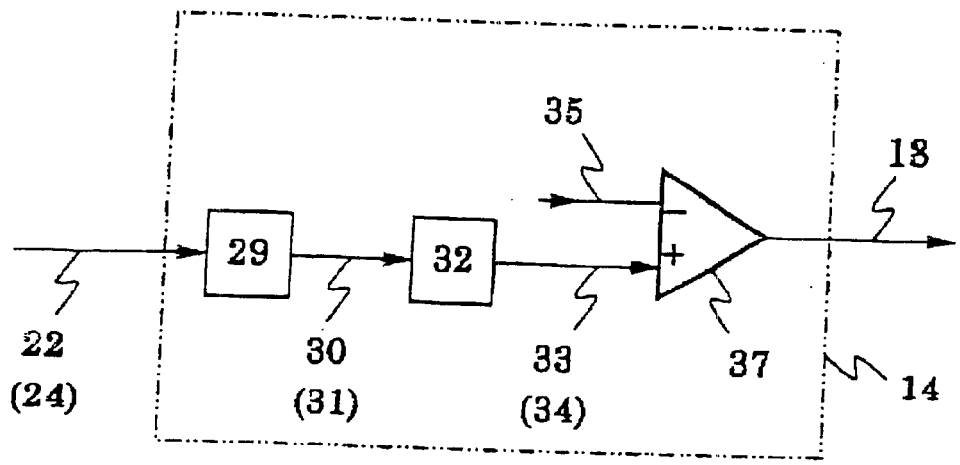
FIG. 3 is a simplified block diagram for the abnormal discharge detection circuit for detecting abnormal discharge due to fluctuation of signals.

FIGS. 2 and 3 show and embodiment wherein the abnormal discharge detection circuit 14 functions in a different manner than that disclosed in the previous embodiment. The fluctuation develops in the level of the capacity regulating signal 22 because the development of abnormal discharge represents an unstable phenomenon. The capacity regulation signal high frequency component signal 30 is obtained by the passage of the capacity regulating signal 22 through a high-pass filter 29 in the abnormal discharge detection circuit 14. A capacity regulation signal fluctuation signal 33 is created by the detection circuit 32 following the detection of the amplitude of the capacity regulation signal high frequency component signal 30, and is constructed using a rectification circuit and a peak hold circuit. When the capacity regulation signal fluctuation signal 33 is detected by a comparator 37 to exceed the capacity regulation signal fluctuation threshold signal 35 corresponding to a preset threshold value, the response 18 that the abnormality had been detected would be fed to the power supply circuit unit 16, thereby safely shutting down the power supply device and preventing any accident from occurring.

The cutoff frequency of the high-pass filter 29 must be empirically determined in accordance with the frequency components of fluctuation attributable to abnormal discharge in actual combinations of the power supply device 9 and the lamp 1. If the effects of electrical noise in the drive circuit 21, etc., must be avoided, it would be effective for the high-pass filter 29 to function as a band pass filter that blocks unnecessary high frequency components. The threshold value for the amplitude of the output signal of the high-pass filter 29 must be empirically determined in combinations of an actual power supply device 9 and the lamp 1. The signal monitored by the abnormal discharge detection circuit 14 may be the signal sent from the capacity regulating signal 22 rather than the capacity regulating signal 22 itself. The function would be identical in that case or if it is another signal having a correlation with the capacity regulating signal 22. The output level detection means 23 that detects the output roughly proportional to the power provided to the dielectric barrier discharge lamp 1 may also detect the current flowing through the lamp 1 in addition to the voltage supplied to the lamp 1, or the output that is detected at that time may be the mean of the peak value, RMS value and absolute value. The voltage of the drive DC power source 27 may be detected as well.

Figure 4:
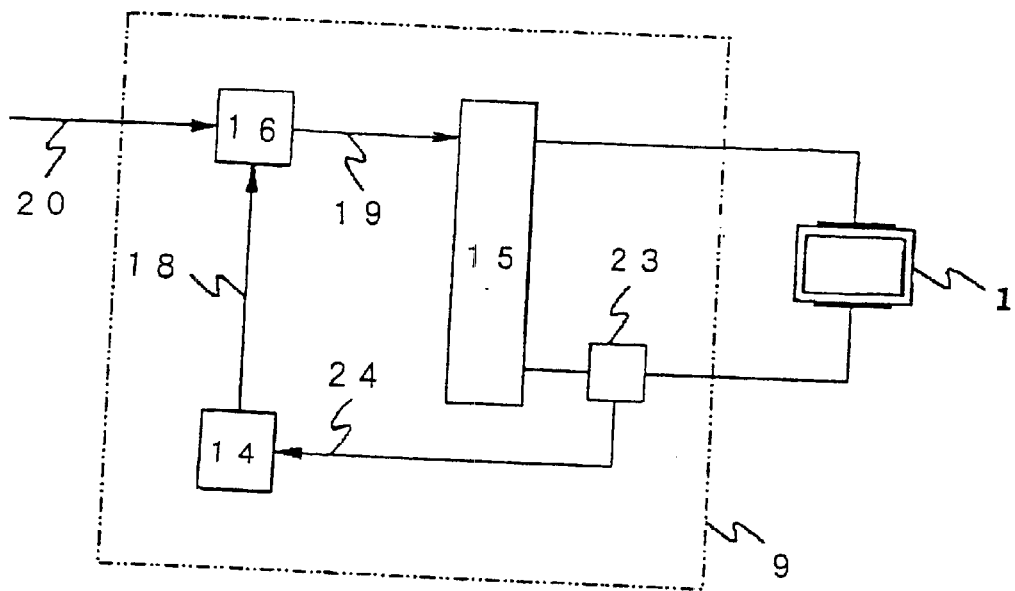
FIG. 4 is a simplified block diagram of a third embodiment of the invention.

FIGS. 3 and 4 show an embodiment of the basic concept of the signal analysis for detecting abnormal discharge by the abnormal discharge detection circuit 14. If an abnormal discharge should develop, voltage or current fluctuation would overlap in the circuit section following the drive circuit 21 since this represents an unstable phenomenon, or fluctuation due to the generation of noise would also overlap the output level detection signal 24 from the output level detection means 23 for the detection of output roughly proportional to the power that is supplied to the dielectric barrier discharge lamp 1 that is mounted in this section. The output level detection signal high frequency component signal 31 is obtained by the passage of the output level detection signal 24 through the high-pass filter 29 in the abnormal discharge detection circuit 14. The output level detection signal fluctuation signal 34 is created following the detection of the amplitude of the output level detection signal high frequency component signal 31 that is created by the detection circuit 32 that is constructed using a rectification circuit and a peak hold circuit. When this is detected by the comparator 37 to exceed the output level detection signal fluctuation threshold signal 35 corresponding to a preset threshold value, the response 18 that the abnormality had been detected would be fed to power supply circuit unit 16, thereby safely shutting down the power supply device and preventing any accident from occurring.

The cutoff frequency of the high-pass filter 29 must be empirically determined in accordance with the frequency components of fluctuation attributable to abnormal discharge in actual combinations of the power supply device 9 and the lamp 1. If the effects of electrical noise in the drive circuit 21, etc., must be avoided, it would be effective for the high-pass filter 29 to function as a band pass filter that blocks unnecessary high frequency components. Setting the filter passage range so as to adequately block the frequency component of alternating current high voltage itself that is applied to the lamp 1, which can be included in the output level detection signal 24, is especially important. The threshold value must be empirically determined in actual combinations of the power supply device 9 and the lamp 1.

Figure 5:
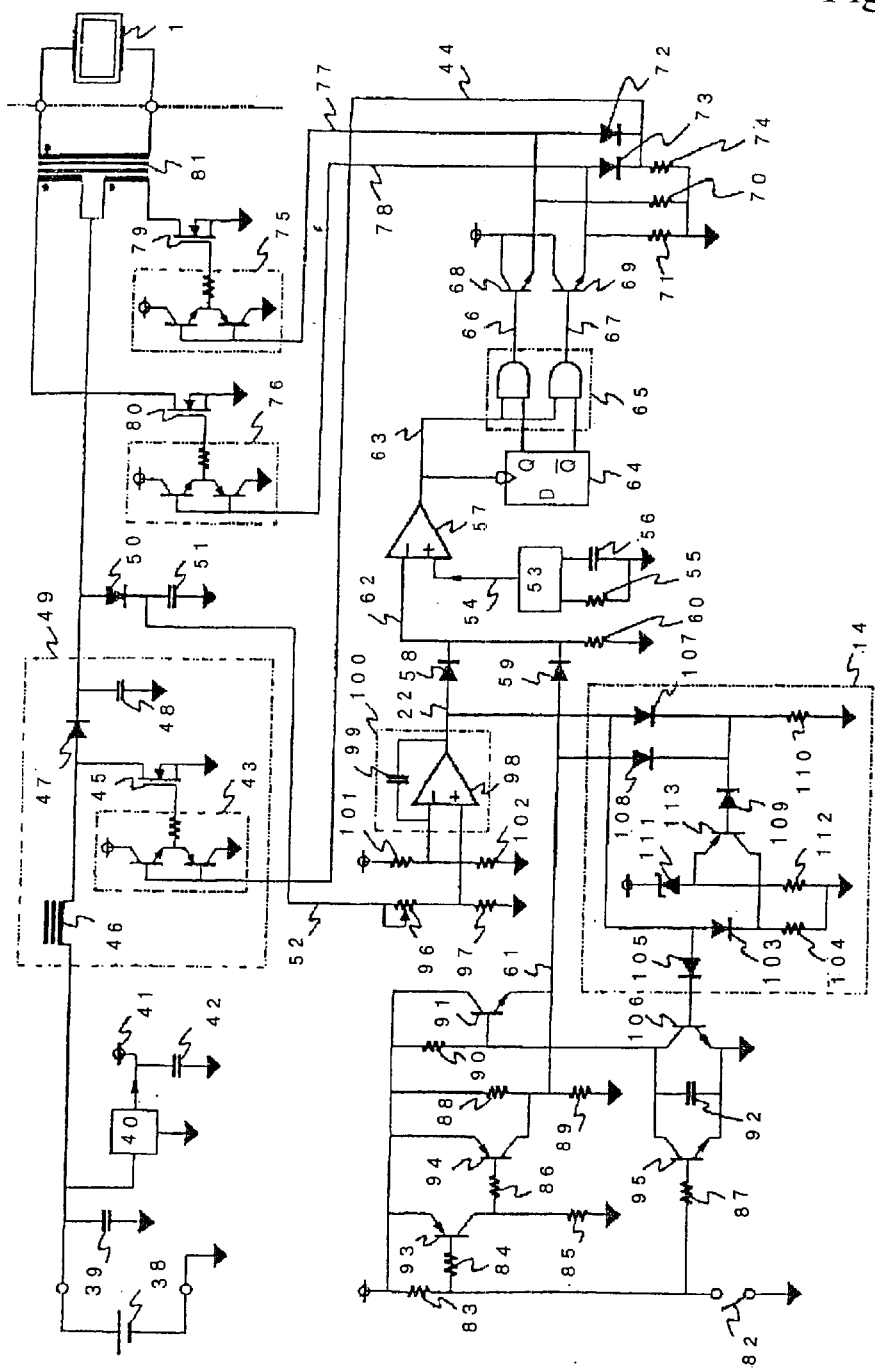
FIG. 5 is a circuit diagram for the first embodiment of the invention.

FIG. 5 shows a simplified block diagram of an exemplary embodiment wherein a boosting chopper DC power source 49 consisting of a chopper gate drive circuit 43, a chopper switch device 45, an inductor 46, a diode 47, and a smoothing capacitor 48. The mean value of a chopper output voltage signal 52, which is the output level detection signal 24 in the first embodiment, is detected via a diode 50 and a capacitor 51 to avoid the effects of the duty ratio of the chopper switch device 45, but these may be eliminated if the demand for precision is moderate and the output voltage of the boosting chopper DC power source 49 used directly as the chopper output voltage signal 52. The smoothing capacitor 39 and the input DC power source 38 are connected to the boosting chopper DC power source 49, and the DC power source circuit 40 for the control circuit is also connected. The output of the DC power source circuit 40 for the control circuit is applied to the smoothing capacitor 42 and the supply of power to each shared circuit component that requires a power supply device is depicted as the DC power source line 41 for the control circuit.

Moreover, a saw-tooth wave generator 53 is employed to create a period saw-tooth wave signal 54 that has a frequency determined by the electrostatic capacitance of capacitor 56 and the resistance of resistor 55. The period saw-tooth wave signal 54 from the saw-tooth wave generator 53 and an effective capacity regulation signal 62 created by the passage of capacity regulating signal 22 through diode 58 are compared by the comparator 57. A base clock signal 63 that becomes the high level is created when the period saw-tooth wave signal 54 is greater than effective capacity regulation signal 62 and this is input to a D flip-flop 64 and a selector 65. The D flip-flop 64 reverses with each fall of base clock signal 63 and selector 65 creates biphasic base gate signals 66, 67 in accordance with the status of D flip-flop 64. The capacity regulating signal 22 and the power supplied to dielectric barrier discharge lamp 1, specifically, the output level detection signal 24, have a negative correlation in the circuit of the first embodiment because of this structure. The peak value selection circuit comprising diode 58, diode 59 and resistor 60 selects the higher voltage of capacity regulating signal 22, or of peak duty specification signal 61 as effective capacity regulation signal 62.

Accordingly, the peak duty specification signal 61 is selected as effective capacity regulation signal 62 since the voltage of peak duty specification signal 61 is substantially equal to the voltage of DC power source line 41 for control circuit in the OFF state. Therefore, a base clock signal 63 is not created due to the maximum voltage of period saw-tooth wave signal 54 is set so that the sequential voltage fraction of diode 59 would be significantly lower than the voltage of DC power source line 41 for control circuit. In the lit state, biphasic base gate signals 66, 67 are fed to inverter gate drive circuits 75, 76 as inverter gate drive signals 77, 78 via a buffer circuit comprising buffer transistors 68, 69 and resistors 70, 71. The inverter gate drive signals 77, 78 are added by resistor 74 via diodes 72, 73, and are input to the chopper gate drive circuit 43 as chopper gate drive signal 44 having double the frequency of inverter gate drive signals 77, 78. The inverter gate drive circuits 75,76 treat boosting chopper DC power source 49 as the drive DC power source 27, drive push-pull inverter comprising inverter switch devices 79, 80 and transformer 81, and add roughly square wave voltage to dielectric barrier discharge lamp (1) which is a load on power supply device 9.

The amplitude of roughly square wave lamp voltage is regulated by the output voltage of drive DC power source 27 while the output voltage of drive DC power source 27 is regulated by the duty ratio of the chopper gate drive signal 44. The chopper gate drive signal 44 is created from inverter gate drive signals 77, 78 in the first embodiment, but this utilizes the facts that roughly square wave voltage is applied to dielectric barrier discharge lamp 1 and that the effective range of inverter gate drive signals 77, 78 essentially ceases to be important since the load current spontaneously expires even without disconnection of the current of power supply device 9 once charging of the capacitor of dielectric barrier discharge lamp 1 has been completed since current flows in light of the fact that dielectrics 7, 8 function as capacitors rather than because of the direct flow of current from capacitors 5, 6 through discharge space 3 because dielectrics 7, 8 are interposed between capacitors 5, 6 and discharge space 3 in dielectric barrier discharge lamp 1, as mentioned above. If fluctuation of the effective range of inverter gate drive signals 77, 78 becomes a problem, a means of making the effective range constant, such as a monostable multivibrator, may be incorporated therein.

Figure 6:
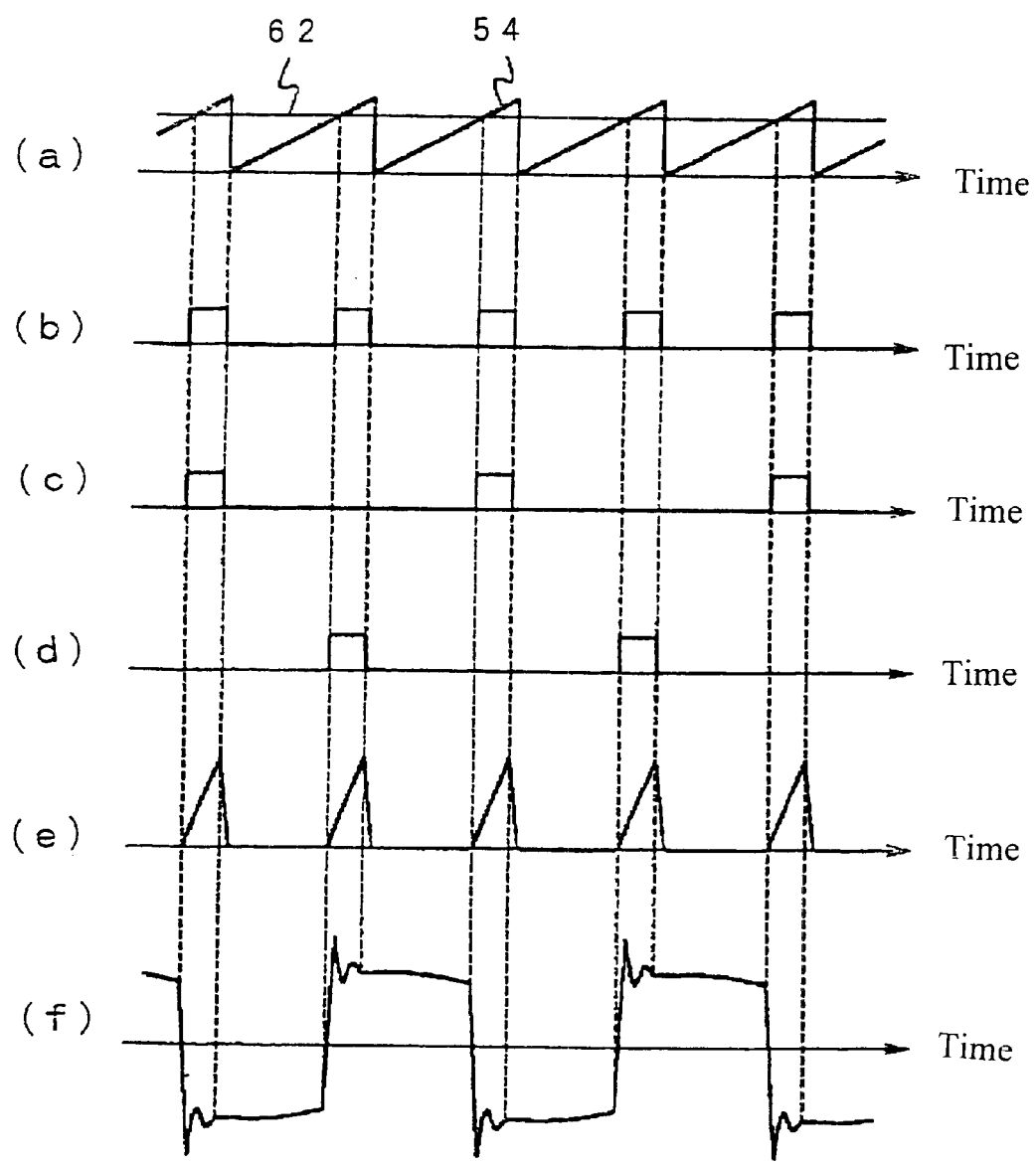
FIG. 6 is a conceptual figure of each waveform in the first embodiment of the invention.

The waveform of each section pertaining to this circuit is shown in FIG. 6, which shows the saw-tooth wave signal 54 and the effective capacity regulation signal 62 in (a), chopper gate drive signal 44 in (b), inverter gate drive signals 77, 78 in (c) and (d), the respective waveforms of the current of inductor 46 in (e), and of the voltage of lamp 1 in (f). In the OFF state, specifically, when light switch 82 is open, current which flows via resistor 90 also flows into the transistor 95 since the transistor 95 is activated via the resistor 87, with the result being that the voltage of capacitor 92 is not elevated. The voltage of peak duty specification signal 61 which had been roughly equal to the voltage of DC power source line 41 for control circuit is lowered to the voltage determined by the differential voltage of resistor 88 and resistor 89 since the shorted state of resistor 88 is released due to deactivation of transistor 94 which had been activated via resistor 86 since the voltage of resistor 85 had been raised by activation of transistor 93 through the circulation of current via resistor 83 and resistor 84 when light switch 82 is closed to transit to the lit state.

The resistance of resistor 88 is regulated so that the maximum power of the power supply device would have appropriate reserve in light of the target rated power since the upper limit of the duty ratio of chopper gate drive signal 44 increases as the voltage falls at this time. When the voltage of peak duty specification signal 61 falls, effective capacity regulation signal 62 falls to a level at which the peak power of the power supply device can be exhibited through operation of the peak value selection circuit comprising diode 58, diode 59 and resistor 60. The creation of base clock signal 63, the activation of chopper gate drive circuit 43, and the drive of chopper switch device 45 commences, whereupon the output voltage of boosting chopper DC power source 49 rises. Next, activation of inverter gate drive circuits 75, 76 as well as drive of inverter switch devices 79, 80 commences, and the application of high voltage alternating current to dielectric barrier discharge lamp 1 commences.

The capacity regulating signal 22 which is the output of error integrator circuit 100 including operational amplifier 98 and integral capacitor 99 is saturated since it reaches virtually zero volts because the differential voltage of chopper output voltage signal 52 due to variable resistor 96 and resistor 97 is lower than the differential voltage due to resistors 101, 102 which determine the target voltage. Consequently, current does not flow through diode 103 and resistor 104, and the transistor 106 is deactivated because current does not flow through diode 105, and the voltage of capacitor 92 begins to rise at a speed determined by the electrostatic capacitance of capacitor 92 and the resistance value of resistor 90 because transistor 95 is also deactivated at that time. However, the output voltage of boosting chopper DC power source 49, specifically, the lamp voltage, rapidly rises since effective capacity regulation signal 62 reaches a level at which the maximum power of power supply device is demonstrated, as mentioned above, immediately after lighting commences. The initial applied voltage required for initial lighting of dielectric barrier discharge lamp 1 is secured and initial lighting is reliably carried out.

Furthermore, the voltage of chopper output voltage signal 52 is determined by the differential voltage attributable to resistors 101, 102. Capacity regulating signal 22 begins to rise at a speed in accordance with the time constant of error integrator circuit 100 even if said target value is temporarily exceeded, and before long, the voltage of chopper output voltage signal 52 is controlled so as to coincide with the target value. Transistor 106 is activated when capacity regulating signal 22 reaches a level determined by resistor 104, and the voltage of capacitor 92 is reset at virtually zero volts. However, if excess power consumption should take place due to localized heating brought about by surface discharge developing in the gap between electrodes 5, 6 on the surface of lamp sealed unit (2), localized heating brought about by the development of dielectric barrier discharge at the insulation borders of cables connected to both electrodes 5, 6, discharge at the junction of output terminals 10, 11 of power supply device 9, discharge within transformers 81, 114 or from the secondary side output terminal of a transformer to output terminals 10, 11 of power supply device 9 as mentioned above, at this time or at a subsequent time, the voltage of chopper output voltage signal 52 would not reach said target value that is determined by the differential voltage attributable to resistors 101, 102 since the duty ratio of chopper gate drive signal 44 is limited to the level of peak duty specification signal 61 that is determined by the resistance of resistor 88. Capacity regulating signal 22 would not rise to the level determined by resistor 104, and current would not flow through diode 103 and resistor 104. Therefore, transistor 106 would be deactivated since current would not flow through diode 105 and the voltage of capacitor 92 would begin to rise.

When this voltage rise exceeds the voltage determined by the differential voltage of resistor 88 and resistor 89, transistor 91 of the emitter-follower connection raises the voltage of resistor 89, specifically, peak duty specification signal 61, to a voltage that is equal to capacitor 92. As the voltage of capacitor 92 continues to rise, the voltage of peak duty specification signal 61 approaches a level roughly equal to the voltage of DC power source line 41 for control circuit before long. The generation of base clock signal 63 stops and the power supply device of the present invention is shut down, thereby preventing any accident from occurring. Conversely, the overall target power consumption would not be reached if discharge should occur at the junction of output terminals 10, 11 of power supply device 9 or if disconnection should develop at capacitor 56, as shown in FIG. 9. Consequently, the error integrator circuit 100 would raise capacity regulating signal 22 so as to correspond to the insufficient load state.

Since current ceases to flow through diode 109 accompanying elevation of capacity regulating signal 22 when the voltage that is generated at resistor 110 via diode 107 exceeds the voltage level determined by constant voltage diode 111 and resistor 112, transistor 113 which had been activated hitherto is deactivated. At this time, transistor 106 is deactivated because current ceases to flow through diode 105 and the voltage of capacitor 92 begins to rise after the voltage of resistor 104 has declined because of obstruction of current which had flowed through resistor 104 via transistor 113. When this voltage rise exceeds the voltage determined by the differential voltage of resistor 88 and resistor 89, transistor 91 of the emitter-follower connection raises the voltage of resistor 89, specifically, peak duty specification signal 61, to a voltage that is equal to capacitor 92. As the voltage of capacitor 92 continues to rise, the voltage of peak duty specification signal 61 approaches a level roughly equal to the voltage of DC power source line 41 for control circuit before long. The generation of base clock signal 63 stops and the power supply device of the present invention is shut down, thereby preventing any accident from occurring.

When the generation of base clock signal 63 in the mechanism is halted accompanying elevation of capacity regulating signal 22, chopper output voltage signal 52 would spontaneously fall before long due to shutdown of boosting chopper DC power source 49 if diode 108 which was inserted in parallel with diode 107 so that current would flow cumulatively through resistor 110 were not present. At that time, error integrator circuit 100 would lower capacity regulating signal 22 so that chopper output voltage signal 52 could recover to the target value. Thereupon, the non-activation of the transistor 113 would be removed and the creation of base clock signal 63 would resume. The diode 108 was inserted to avoid such disadvantageous operation since this would subsequently repeat. Resumption of the generation of base clock signal 63 would be prevented due to the continued flow of current through resistor 110 even if capacity regulating signal 22 should fall so long as peak duty specification signal 61 remains at a high voltage level if diode 108 is present. Such latch operation that is run by diode 108 could be reset by disconnecting light switch 82 and removing the charge of capacitor 92.

The first embodiment of the present invention demonstrates benefits including the ability to completely avoid the dangers of serious accidents that cannot be overlooked for the sake of safety that can arise, including surface discharge developing in the gap between electrodes 5, 6 on the surface of lamp sealed unit 2, dielectric barrier discharge at the insulation borders of cables connected to both electrodes 5, 6, discharge at the junction of output terminals 10, 11 of power supply device 9, discharge within transformers 81, 114 or from the secondary side output terminal of a transformer to output terminals 10, 11 of power supply device 9, or disconnection at electrodes 5, 6 as shown in FIG. 9. The invention has the extremely high value of preventing any accident from occurring by safely shutting down the power supply device if a short should develop anywhere within transformers 81, 114 in power supply device 9 or in the route from the secondary side output terminal of a transformer to electrodes 5, 6 of lamp 1, or, if a non-load open state should develop when absolutely no power is supplied to lamp 1, as mentioned above.

Figure 7:
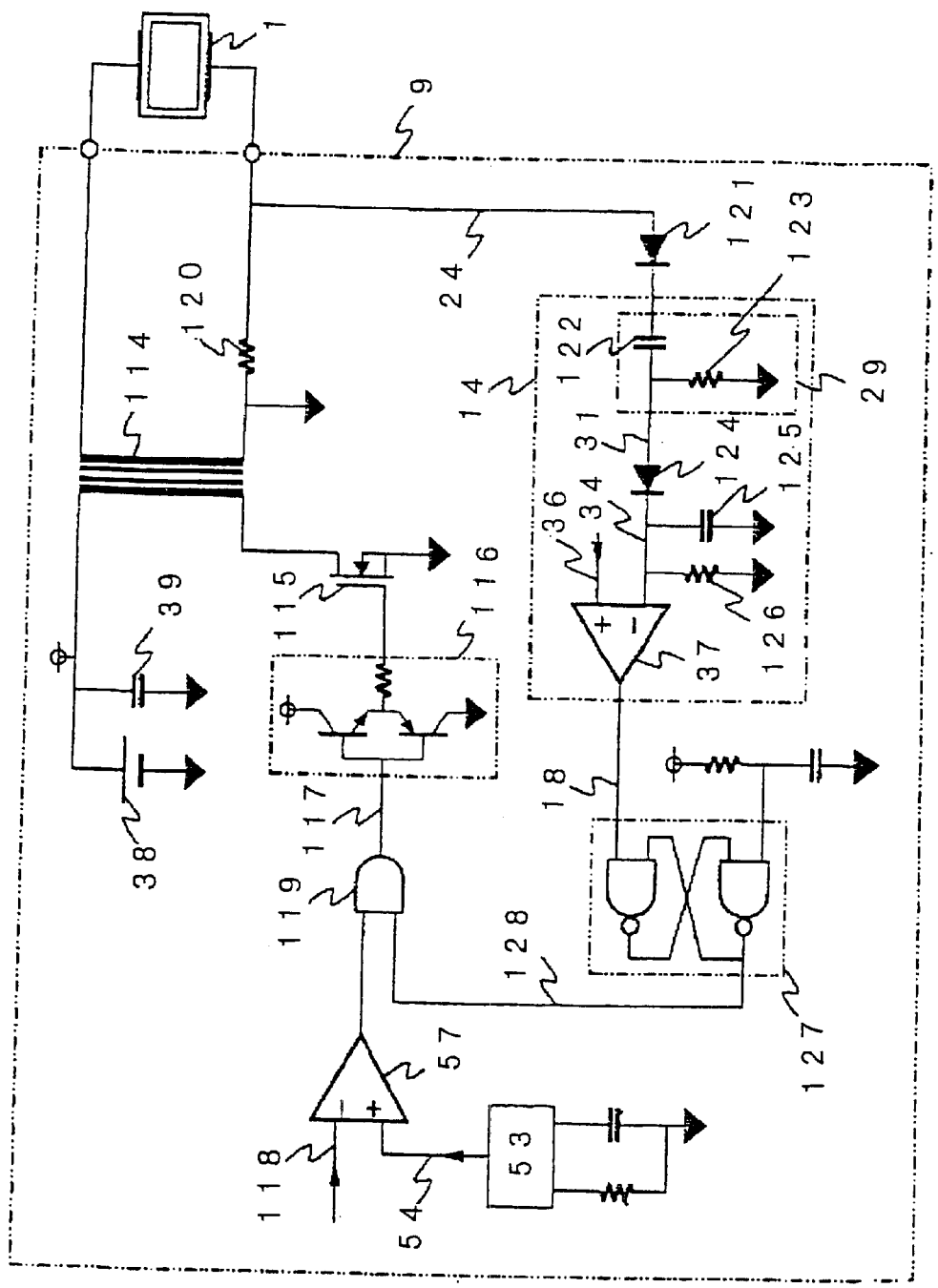
FIG. 7 is a circuit diagram of the second embodiment of the invention.

FIG. 7 is a simplified block diagram of a second embodiment including a flyback inverter system wherein one end of the primary-side winding of transistor 114 is connected to input DC power source 38 while the other end is connected to inverter switch device 115 driven by gate drive circuit 116. Comparator 57 compares period saw-tooth wave signal 54 from saw-tooth wave generator 53 with duty ratio setting signal 118 that sets the capacity of power supply device 9. The output is then input to gate drive circuit 116 as gate drive signal 117 via gate 119.

Figure 8:
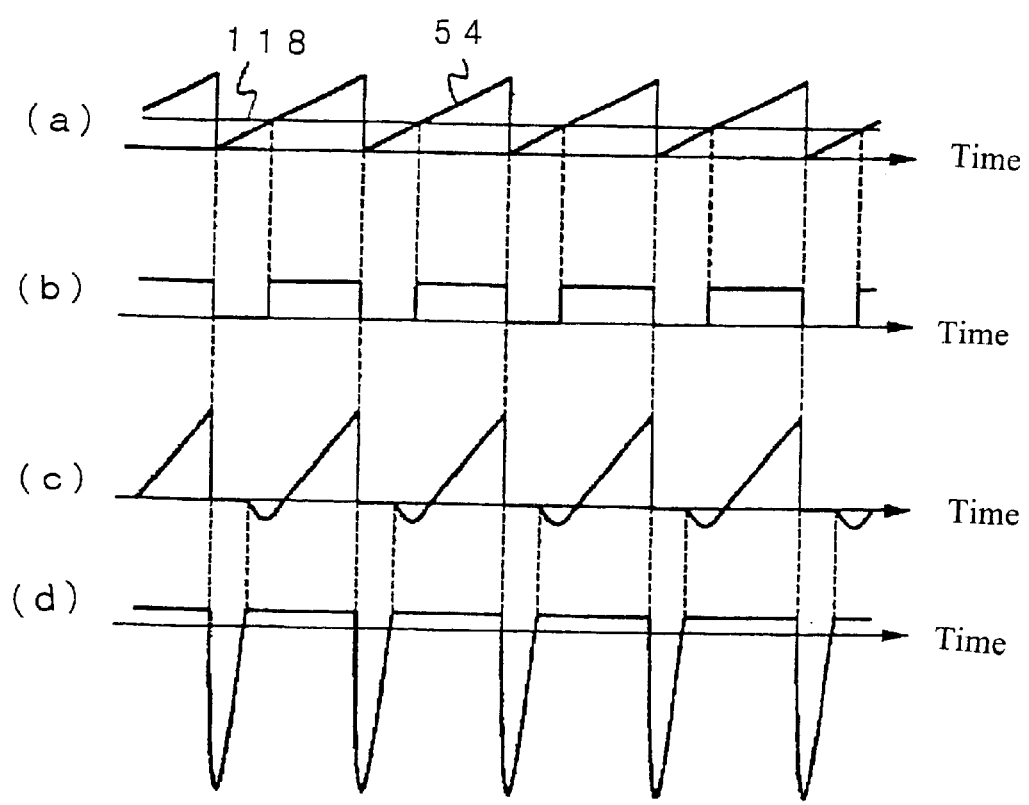
FIG. 8 is a conceptual figure of each waveform in the second embodiment of the invention.

FIG. 8 shows the waveforms associated with this circuit. The waveforms of period saw-tooth wave signal 54 and duty ratio setting signal 118 are shown in (a), the waveform of gate drive signal 117 is shown in (b), the waveform of the current on the primary side of transistor 114 is shown in (c), and the waveform on the secondary side of transistor 114 is shown in (d). One end of the secondary side winding of transistor 114 is connected to the ground of the circuit while the other end is connected to one of electrodes 5, 6 of lamp 1 as a terminal, the high-voltage side. The other electrode of lamp 1 is connected to the circuit ground via resistor 120. Resistor 120 functions as output level detection means 23 for detecting the output roughly proportional to the power provided to the dielectric barrier discharge lamp 1 since it can detect the current flowing through lamp 1 by measuring the terminal voltage. Resistor 120 may be a circuit device other than a resistor, such as an impedance device including a capacitor.

Diode 121 selects only components having positive polarity and converts them into output roughly proportional to the power. Output level detection signal 24 from resistor 120 appears when discharge develops via high-pass filter 29 comprising capacitor 122 and resistor 123, and it fluctuates greatly. Otherwise, only output level detection signal high frequency component signal 31 including noise is selected and transited. The peak value of output level detection signal high frequency component signal 31 which is transited is retained as output level detection signal fluctuation signal 34 via diode 124 and capacitor 125. It is then input to comparator 37 with output level detection signal fluctuation threshold signal 36. The attenuation speed of output level detection signal fluctuation signal 34 that is retained is established by resistor 126. When output level detection signal fluctuation signal 34 is greater than output level detection signal fluctuation threshold signal 36, comparator 37 inputs response 18 of detection of a low-level abnormality to latch circuit 127. Latch circuit 127 changes latch output signal 128 which is the output to a low level and retains it.

The power supply device is safely shut down and any accident is prevented from occurring since the output of comparator 57 cannot transit through gate 119 if latch output signal 128 is at the low level. Resistor 129 and capacitor 130 set latch output signal 128 at a high level after automatically initializing latch circuit 127 when input DC power source 38 of power supply device 9 is activated. They may be structured so as to initialize it based on an external signal instead of resistor 129 and capacitor 130.

As explained above, the second embodiment of the invention demonstrates benefits including the ability to completely avoid the dangers of serious accidents that cannot be overlooked for the sake of safety that can arise, including surface discharge developing in the gap between electrodes 5, 6 on the surface of lamp sealed unit 2, dielectric barrier discharge at the insulation borders of cables connected to both electrodes 5, 6, discharge at the junction of output terminals 10, 11 of power supply device 9, and discharge from disconnection at electrodes 5, 6 as shown in FIG. 9.

In another embodiment the abnormal discharge detection circuit 14 shown in FIG. 5, may be replaced with the circuit shown in FIG. 7. Moreover, the various embodiments may be combined, by means of which a dielectric barrier discharge lamp light source device having far more reliable detection of abnormal discharge can be realized. The reason is that redundancy would be introduced into the system since the principles of detecting abnormal discharge differ among the embodiments. For example, a dielectric barrier discharge lamp light source device combining the features of the embodiments can be realized through improvements so that transistor 106 is deactivated even when the output of comparator 37 is low level by adding sections comprising resistor 120, diode 121 and abnormal discharge detection circuit 14 from the structure shown in FIG. 7 to the structure shown in FIG. 5 and by connecting the output of comparator 37 to the base of transistor 106 via an additional diode. However, the directions of the additional diode would be toward the side of comparator 37 by the cathode and toward the side of transistor 106 by the anode.

The embodiment has been explained using a push-pull inverter and a flyback inverter as the drive circuit, but the efficacy of the invention would be similarly realized by a structure using other modalities such as half-bridge inverters, full-bridge inverters or other types of inverters. While an embodiment in accordance with the presented a concrete circuit structure, other outstanding benefits of the invention can be effectively demonstrated in a dielectric barrier discharge lamp light source device without being restricted to said structure.

Moreover, the details of circuit operation explained in the embodiments such as inventive measures including signal polarity, the selection, addition, elimination of concrete circuit devices, the insertion of devices or modifications based upon economic grounds may be actively carried out in the design of actual devices. For example, sequential connection of the necessary number of conventional diodes if the voltage of constant voltage diode 111 shown in FIG. 5 is too low to permit the use of a commercial tuner diode, or survey and adoption of commercial integrated circuits (for example, TL494 from Texas Instruments or μPC494 from NEC Corporation) that integrate part or all of the constituent circuit components that appear in the exemplary embodiment such as DC power source circuit 40 for control circuit, saw-tooth wave generator 53, inverter gate drive circuits 75, 76, and operational amplifier 98 would fall within the purview of said inventive measures.

Furthermore, the benefits of the invention are best demonstrated when the elements associated with detection of abnormal discharge such as output level detection means 23 are structured integrally with power supply device 9, but if part or all thereof are installed separately from the body of power supply device 9 with signal reception accomplished using a cable for some reason, the functional benefits of the present invention would still be effectively demonstrated. Of course, any discharge gas may be applied absolutely independently in the present invention. For example, metal vapors such as mercury or mixtures/compounds of these with halogens known as metal halides may be effectively employed. Furthermore, noble gases such as neon, argon, krypton, xenon, radon as well as mixtures/compounds of these with halogens including fluorine, chlorine, bromine, etc., can be applied as discharge gases to so-called dielectric barrier discharge excimer lamps as well that generate ultraviolet light by excimer emission.

Furthermore, the present invention is extremely useful in fluorescent lamps that utilize light emission of visible light by excitation of ruminants through light emissions that are created from discharge gas having a phosphor formed on at least part of the inner or outer surface of said sealed unit 2.

What is claimed is:

1. A dielectric barrier discharge lamp light source device having a discharge space filled with a discharge gas that emits light through a dielectric barrier discharge, said dielectric barrier discharge lamp light source device comprising:

a dielectric barrier discharge lamp having dielectrics interposed between at least one of a first electrode and a second electrode to induce a discharge phenomenon in said discharge gas; and;

a power supply device for providing alternating current high voltage to said first electrode and said second electrode, said power supply device including an abnormal discharge detection circuit for detecting an abnormal discharge occurring within at least one of a transformer in said power supply device and a section of the power supply circuit from a secondary side output terminal of said transformer to said first electrode and said second electrode, wherein said power supply device is responsive to detection of said abnormal discharge by said abnormal discharge detection circuit for terminating the provision of alternating current high voltage to said electrodes, wherein said abnormal discharge detection circuit is operative for detecting only an abnormal discharge arising from electrical behavior produced from said power supply device without detecting a special abnormal discharge due to at least one of photo, acoustic, thermal or chemical conditions.

2. The dielectric barrier discharge lamp light source device according to claim 1, wherein said power supply device further includes an output level detection means for detecting an output substantially proportional to the power provided to said dielectric barrier discharge lamp in a stage after said drive circuit.

3. The dielectric barrier discharge lamp light source device according to claim 2, wherein said abnormal discharge detection circuit detects when a frequency range component of an output level detection signal created by said output level detection means has a preset fluctuation exceeds a predetermined level.

4. The dielectric barrier discharge lamp light source device according to claim 1, wherein said power supply device further includes an output level detection means for detecting an output substantially proportional to the alternating current high voltage provided to said dielectric barrier discharge lamp, a drive circuit for providing high voltage alternating current power to said dielectric barrier discharge lamp, and a capacity control circuit for regulating the power supply capacity of said drive circuit.

5. The dielectric barrier discharge lamp light source device according to claim 4, wherein said drive circuit is responsive to a capacity regulating signal from said capacity control circuit for setting the power supply capacity.

6. The dielectric barrier discharge lamp light source device according to claim 4, wherein said capacity control circuit effects a feedback control of said capacity regulating signal so as to minimize an error between an output level detection signal created by said output level detection means and an output level target signal.

7. The dielectric barrier discharge lamp light source device according to claim 4, wherein said abnormal discharge detection circuit is operative for detecting at least one of a deviation of said capacity regulating signal from an upper limit of an predetermined capacity and a deviation of said capacity regulating signal from a lower limit of said predetermined capacity.

8. The dielectric barrier discharge lamp light source device according to claim 1, wherein said power supply device further includes an output level detection means for detecting an output substantially proportional to the power provided to said dielectric barrier discharge lamp, a drive circuit for providing high voltage alternating current power to said dielectric barrier discharge lamp, and a capacity control circuit for regulating the power supply capacity of said drive circuit.

9. The dielectric barrier discharge lamp light source device according to claim 8, wherein said drive circuit is responsive to a capacity regulating signal from said capacity control circuit for setting the power supply capacity.

10. The dielectric barrier discharge lamp light source device according to claim 8, wherein said capacity control circuit is operative to effect a feedback control of said capacity regulating signal so as to minimize an error between an output level detection signal created by said output level detection means and an output level target signal.

11. The dielectric barrier discharge lamp light source device according to claim 8, wherein said abnormal discharge detection circuit is operative for detecting when a frequency range component of said capacity regulating signal has a preset fluctuation exceeds a predetermined level.

* * * * *